(12) United States Patent
Chu

(10) Patent No.: US 10,909,979 B1
(45) Date of Patent: Feb. 2, 2021

(54) VOICE CONTROLLED REMOTE THERMOMETER

(71) Applicant: EWIG INDUSTRIES MACAO COMMERCIAL OFFSHORE LIMITED, Kowloon (HK)

(72) Inventor: Luk Wah Jackson Chu, New Territories (HK)

(73) Assignee: EWIG INDUSTRIES MACAO COMMERCIAL OFFSHORE LIMITED

( * ) Notice: Subject to any disclaimer, the term of this patent is extended or adjusted under 35 U.S.C. 154(b) by 0 days.

(21) Appl. No.: 15/856,225

(22) Filed: Dec. 28, 2017

Related U.S. Application Data (60) Provisional application No. 62/589,282, filed on Nov. 21, 2017.

(51) Int. Cl.
| | |
|---|---|
| *G10L 15/22* | (2006.01) |
| *G10L 15/30* | (2013.01) |
| *G06F 3/16* | (2006.01) |
| *G08C 17/02* | (2006.01) |
| *G08B 21/18* | (2006.01) |

(Continued)

(52) U.S. Cl.
CPC .............. *G10L 15/22* (2013.01); *G01K 3/005* (2013.01); *G01K 13/00* (2013.01); *G06F 3/167* (2013.01); *G08B 3/10* (2013.01); *G08B 21/182* (2013.01); *G08C 17/02* (2013.01); *G09B 5/06* (2013.01); *G09B 19/0092* (2013.01); *G10L 15/30* (2013.01); *G01K 2207/06* (2013.01); *G08C 2201/31* (2013.01); *G10L 2015/223* (2013.01)

(58) Field of Classification Search
CPC ......... G10L 15/22; G10L 15/30; G01K 3/005; G01K 13/00; G06F 3/167; G08B 3/10; G08B 21/182; G08C 17/02; G09B 5/06; G09B 19/0092
See application file for complete search history.

(56) References Cited

U.S. PATENT DOCUMENTS

| | | | |
|---|---|---|---|
| 8,931,400 B1 * | 1/2015 | Allen | H04Q 9/00 99/344 |
| 9,183,738 B1 * | 11/2015 | Allen, Sr. | A61B 5/6807 |

(Continued)

*Primary Examiner* — Mohammad K Islam
(74) *Attorney, Agent, or Firm* — McCarter & English, LLP (57) ABSTRACT

A wireless or remote thermometer connected with an artificial intelligence (AI) system. The thermometer may be in communication with a voice-activated AI system to implement operation thereof, such as a cloud-based AI system implemented on a smart audio interface. User-accessible controls for the thermometer may be activated using the voice-activated AI system on the audio interface. The thermometer may include a wireless transceiver for communication with a user. The thermometer collects temperature measurement data to remotely monitor the temperature of food or other materials. The thermometer connects and communicates wirelessly with a receiver unit, such as user smartphone, tablet, or other computerized device. The thermometer unit sends data, alerts or notifications to the delegated receiver, smart device, and/or audio interface, to the user. Communication between the thermometer and receiver unit may be through one or more communication pathways, which may be selected to provide delivery to the user device.

41 Claims, 6 Drawing Sheets

(51) Int. Cl.
*G08B 3/10* (2006.01)
*G01K 13/00* (2006.01)
*G09B 19/00* (2006.01)
*G09B 5/06* (2006.01)
*G01K 3/00* (2006.01)

(56) References Cited

U.S. PATENT DOCUMENTS

| | | | |
|---|---|---|---|
| 9,905,122 B2* | 2/2018 | Sloo | F24F 11/30 |
| 9,953,514 B2* | 4/2018 | Fadell | G08B 27/003 |
| 9,959,728 B2* | 5/2018 | True | G08B 21/02 |
| 9,980,321 B2* | 5/2018 | Sorenson | A47J 37/0611 |
| 10,048,135 B2* | 8/2018 | Koetz | G01K 1/024 |
| 10,060,802 B1* | 8/2018 | Ragosta | G01K 13/002 |
| 10,067,004 B1* | 9/2018 | Allen | G01K 13/00 |
| 2015/0053779 A1* | 2/2015 | Adamek | F24F 11/30 236/1 C |
| 2017/0026195 A1* | 1/2017 | Pan | H04L 12/282 |
| 2017/0289257 A1* | 10/2017 | Colston | G08B 21/18 |

* cited by examiner

VOICE CONTROLLED REMOTE THERMOMETER

CROSS-REFERENCE TO RELATED APPLICATIONS

This patent application claims benefit under 35 U.S.C. § 119(e) to U.S. Provisional Patent Application Ser. No. 62/589,282, filed Nov. 21, 2017, entitled "Voice Controlled Remote Thermometer," which is hereby expressly incorporated by reference in its entirety as part of the present disclosure.

FIELD OF THE INVENTION

The present invention relates to temperature monitoring systems and methods, such as for food preparation.

BACKGROUND

Often, when cooking, it is desired that a cooking temperature be maintained or that an item of food is cooked to a desired temperature. The cooking temperature and cooking time can greatly determine the taste of the food. Indeed, many people prefer certain food, such as meats, to be cooked at certain temperatures or to a certain internal temperature. Additionally, certain foods need to be cooked to a safe temperature before being consumed. The U.S. Department of Agriculture (USDA) provides guidelines establishing food temperatures at which it considers meats to be adequately cooked. This ensures that any bacteria in the food have been destroyed.

Food thermometers can greatly improve the outcome of cooking by helping the user determine the cooking condition of the food, e.g., internal temperature, and the right time to stop cooking the food, for example. Traditionally, food thermometers read out on the thermometer probe itself or on a display immediately attached to the thermometer probe. A user must remain in the area of the cooking equipment in order to monitor the food temperature. Especially in closed environments such as barbecue grills and ovens, it may be difficult to observe the readings on the probe. Moreover, the cook is prevented from leaving the area for other activities. Wireless thermometers include a transceiver, or a transmitter and a receiver. A thermometer unit may include two or more temperature probes to detect food temperatures or barbecue chamber temperatures. The thermometer allows users to monitor the temperature of food, e.g., while it cooks in the oven or on a grill, remotely, via a wireless link between the thermometer unit and a receiving unit. The wireless link may be implemented on Wi-Fi, Bluetooth, or other types of proprietary or open radio frequency platforms.

Presently known remote thermometer devices have several drawbacks. The user must control and monitor the thermometer with the receiving unit. While wireless, the user must generally remain in the vicinity of the thermometer. These devices may fail to alert users when the food has finished cooking and therefore cause the food to be overcooked.

SUMMARY

An object of the invention is a wireless thermometer operatively connected with an artificial intelligence (AI) system. The systems and methods described herein may be implemented in conjunction with a voice-activated AI system, such as a cloud-based AI system implemented on a smart audio interface. User-accessible controls for the thermometer can be activated using a voice-activated AI system, e.g., on the smart audio interface. In some embodiments, the wireless barbeque thermometer includes a high-temperature thermometer or thermosensor operatively connectable with or including a built-in wireless transceiver. The thermometer is used to collect temperature measurement data and to remotely monitor the temperature probes.

The thermometer may connect wirelessly to a delegated receiver unit or a user's smartphone, tablet, or other device, such as devices using iOS, Android or other operating system(s). The thermometer may send sensed temperature information to a delegated receiver, smart device, and/or smart audio interface, of a user, which may process the temperature information and generate alerts or notifications for the user, e.g., an indication of the sensed temperature. The alerts may indicate to the user that the food is finished cooking, by comparing temperature data to a pre-selected temperature indicative of a desired cooking level. The alert may further indicate that the food is ready or finished cooking according to a taste level setting inputted by a user according to the user's preference. Said taste level may correspond to a food temperature to which the actual food temperature sensed by the thermometer can be compared. The alert may also indicate that a temperature or temperature range of the cooking device, e.g., a barbeque, oven, etc., has exceed a preselected temperature or range. Alternatively, or in addition, the thermometer unit may generate and send alerts or notifications to the user through the delegated receiver, smart device, and/or smart audio interface.

In some embodiments, the wireless barbeque thermometer is part of a programmable thermometer timer system that assists cooking food to a desired temperature or level, improves food safety and/or helps prevent foodborne illnesses. In some embodiments, the programmable thermometer timer system ensures that various types of food such as beef, veal, lamb, pork, chicken, and turkey are cooked in accordance with guidelines established by the USDA. Furthermore, this programmable thermometer timer system allows an end user to program the thermometer to alert the user when the food has reached a temperature or doneness according to the user's intentions or preferences.

In some embodiments, a voice-activated AI system is communicatively connectable with the wireless barbeque thermometer and provides voice-activated AI services and features based on user history. The communication between the AI system and the thermometer may be direct, e.g., by direct Wi-Fi, Bluetooth/Bluetooth Low Energy (BLE) or other communication between them, or indirectly, through one more intermediate wireless devices, local or wide area network, or combination of the same. The programmable thermometer timer system including voice-activated AI system may enable the user's temperature control and provide temperature and/or cooking instructions or guidelines to the user based on, for example, historical user data, USDA guidelines, or third-party cooking guides. The voice-activated AI system implemented via the smart audio interface may further provide alerts to a user even when the user has exceeded a range of the wireless barbeque thermometer itself. The voice-activated AI system as implemented by the smart audio interface for a voice-controlled barbeque thermometer will be discussed in further detail below.

Some embodiments provide temperature monitoring systems and methods for monitoring and/or controlling a wireless thermometer. In various embodiments, temperature data is reported to a computer or computerized electronic device that is not specific to heating applications, but has the necessary existing hardware, firmware and/or software capabilities so that a heating application, e.g., a program or computer application, may be installed and executed, on a temporary or permanent basis, and to communicate with the wireless barbecue thermometer. Examples of such devices include, but are not limited to, smartphones (Android, iOS, etc.), computers (desktop, laptop, etc.), handheld computing devices, and other portable computerized devices (PDA, IPAD, IPOD, etc.).

Such devices also provide flexibility in the software application because it can take advantage of the existing capabilities of the computerized electronic device. Such capabilities may include, by way of example only, storing and/or downloading (e.g., Internet) information such as multimedia for presentation or playback to the user, and the ability to easily alter or update the software application itself. Further, where the device is portable, the user may move to other locations and/or attend to other activities and remain updated as to the status of the item.

Certain embodiments may be used for food preparation, such as for cooking or heating food. In such embodiments, the temperature of the food and the cooking temperature are monitored and/or controlled. More specifically, the temperature of the food is monitored and/or controlled using a voice-activated artificial intelligence system provided by a cloud server communicatively coupled with a smart audio interface. In some such embodiments, the voice-activated artificial intelligence system is used to advise the user of a temperature setting, which is used to set the cooking temperature and ultimately the characteristics of the food. This frees the user to focus on other tasks while the food is cooking and helps prevent the food from overcooking. The device may be further configured to notify a user of a temperature or food setting being met or exceeded.

In one aspect, a wireless thermometer system includes a wireless thermometer. The wireless thermometer is communicatively connected with a temperature sensor for sensing a temperature. The wireless thermometer wirelessly transmits temperature data sensed by the temperature sensor (e.g., to a smart audio interface). The system also includes a smart audio interface (e.g., a smart home speaker or smart home device hub). The smart audio interface may include a microphone and a speaker or may be communicatively connectable to a microphone and a speaker (e.g., a microphone and a speaker of a smart device such as a smart phone or tablet). The smart audio interface is communicatively coupled or coupleable to a cloud server. The cloud server includes an artificial intelligence (e.g., a voice-activated artificial intelligence) that processes and generates a response to the voice command, if appropriate, to a voice command received by the microphone. The smart audio interface can generate an audio notification based on the response received from the artificial intelligence, such as a notification for broadcast on the speaker. The smart audio interface further obtains, using the microphone, a voice command selecting a temperature parameter (e.g., a target temperature setting, a target temperature range, and/or a timer value). The smart audio interface wirelessly receives the temperature data from the wireless thermometer. The smart audio interface transmits the temperature data to the artificial intelligence. If the temperature parameter has been met or exceeded based on a comparison of the temperature data and the temperature parameter by the artificial intelligence, the smart audio interface provides an audio notification indicating that the temperature parameter has been met or exceeded for broadcast on the speaker.

In some embodiments, the speaker is part of the smart audio interface and the smart audio interface broadcasts the audio notification. In other aspects, the system includes a smart device with the microphone and the speaker and communicatively coupled or coupleable with the cloud server. In some embodiments, the artificial intelligence is adapted to generate the audio notification for broadcast on the speaker of the smart device. In some embodiments, the smart device is adapted to receive the generated audio notification from the artificial intelligence over a cellular data communications network or other network. In some embodiments, the smart audio interface is adapted to generate the audio notification for broadcast on the speaker of the smart device.

In some embodiments, there are at least two temperature sensors. In some embodiments, the at least two temperature sensors include a food temperature sensor adapted to sense a food temperature and a cooking device temperature sensor adapted to sense a temperature of a cooking device. In some embodiments, the temperature parameter defines a food temperature limit, and the audio notification indicates that a food temperature sensed by the food temperature sensor meets or exceeds the food temperature limit. In some embodiments, the temperature parameter includes a cooking device temperature limit or range, and the audio notification is configured to indicate that a cooking device temperature sensed by the cooking device temperature sensor exceeds or is outside the cooking device temperature limit or range.

In some embodiments, the temperature parameter includes a cooking time of a food item. The smart audio interface provides an audio notification for broadcast on the speaker indicating that a time for which the food item has been cooked meets or exceeds the cooking time.

In some embodiments, the system may generate an audio notification (e.g., verbally, with spoken words) suggesting a temperature parameter for a food item generated by the artificial intelligence based on a food taste setting, a food preparation guideline, or a user preference setting for said food item. In some embodiments, the smart audio interface stores temperature parameters previously selected by a user, e.g., via the microphone. In embodiments where the temperature parameter relates to cooking a food, for example, the smart audio interface provides an audio notification suggesting a temperature parameter for cooking the food, e.g., generated by the artificial intelligence, based on previously selected temperature parameters. In some such embodiments, the smart audio interface is adapted to transmit the previously selected temperature parameters to the cloud server. The user may optionally select the suggested temperature parameter. Advantageously, the food can be cooked in a manner as similar food was previously cooked, e.g., to the user's liking.

In some embodiments, the temperature parameter includes a warning temperature that is lower than the temperature limit or higher than the temperature limit. If the warning temperature has been exceeded, e.g., as determined by the artificial intelligence upon comparison of the temperature data and the warning temperature, the audio notification can indicate that the warning temperature has been met or exceeded.

In yet other embodiments, the smart audio interface is further adapted to obtain, with the microphone, a voice command requesting an audio notification indicating said temperature data. The smart audio interface provides an audio notification for broadcast on the speaker indicating the temperature data, generated by the artificial intelligence. Advantageously, this allows the user, for example, to receive the current measured temperature (e.g., food or cooking device), to assess the current state of the food or cooking device.

In some embodiments, the smart audio interface is adapted to transmit the temperature parameter to the wireless thermometer, and the wireless thermometer is adapted to receive and store the temperature parameter from the smart audio interface. The wireless thermometer compares said sensed temperature data to said temperature parameter, and can generate an audio alert when the temperature parameter has been met or exceeded. In some such embodiments, the smart audio interface is adapted to obtain, with the microphone, a voice command requesting that the audio alert of the thermometer be disabled or muted. The smart audio interface then transmits an instruction to the wireless thermometer to disable or mute the audio alert, and the wireless thermometer disables or mutes the audio alert.

In some embodiments, the system includes a smart device separate from the smart audio interface, wherein the wireless thermometer and the smart audio interface are configured to directly wirelessly communicate via a first communications pathway, the wireless thermometer and the smart device are configured to directly wirelessly communicate via a second communications pathway, the smart audio interface and the smart device are configured to directly wirelessly communicate via a third communications pathway, the smart audio interface and the cloud server are configured to communicate via a fourth communications pathway, and the cloud server and the smart device are configured to communicate via a fifth communications pathway. In some embodiments, the wireless thermometer and the smart audio interface communicate via the first communications pathway (e.g., by default) when the first communications pathway is available for communication therebetween. If the first communications pathway is not available, e.g., the communication link is or can be established (which may occur for example, if the two components are not in range with each other), they communicate via the other pathways, e.g., the second, third, fourth and/or fifth communications pathways. Similarly, in some embodiments the smart audio interface and the smart device communicate via the third communications pathway (e.g., by default) when the third communications pathway is available for communication therebetween. If the third communications pathway is not available, e.g., the communication link is or can be established (which may occur for example, if the two components are not in range with each other), they communicate via the other pathways, e.g., the first, second, fourth and fifth communications pathway when said third communications pathway is not available for communication therebetween.

In some aspects, a method includes obtaining a voice command selecting a temperature parameter, with a microphone of a smart audio interface, sensing a temperature with a temperature sensor of a wireless thermometer, wirelessly transmitting the temperature to the smart audio interface, and transmitting the at least one temperature to an artificial intelligence with the smart audio interface. When the temperature parameter has been met or exceeded based upon a comparison of the sensed temperature and the temperature parameter by the artificial intelligence, an audio notification (e.g., an audio alert or spoken words) is provided to notify a user, e.g., broadcast on a speaker of the smart audio interface or other device. In some embodiments, the temperature parameter defines a temperature limit and the audio notification indicates that the sensed temperature has met or exceeded the temperature limit. In additional embodiments, the temperature parameter defines a temperature range and the audio notification indicates that the temperature is outside of the temperature range.

In yet further embodiments, the temperature parameter defines a temperature limit and a warning temperature that is lower or higher than the temperature limit. When the warning temperature has been met or exceeded based upon a comparison of the temperature data and the warning temperature, an audio notification thereof is provided, e.g., broadcast on a speaker. Advantageously, the method can provide a user with time prior to the temperature parameter being met or exceed to, for example, stop the cooking before the food is overcooked.

Though certain embodiments herein are described with respect to a wireless thermometer, the invention may be utilized with any suitable wireless device.

Other objects and advantages of the present invention will become apparent in view of the following detailed description of the embodiments and the accompanying drawings.

DETAILED DESCRIPTION OF EMBODIMENTS

Various embodiments are described with respect to the accompanying figures.

Figure 1:
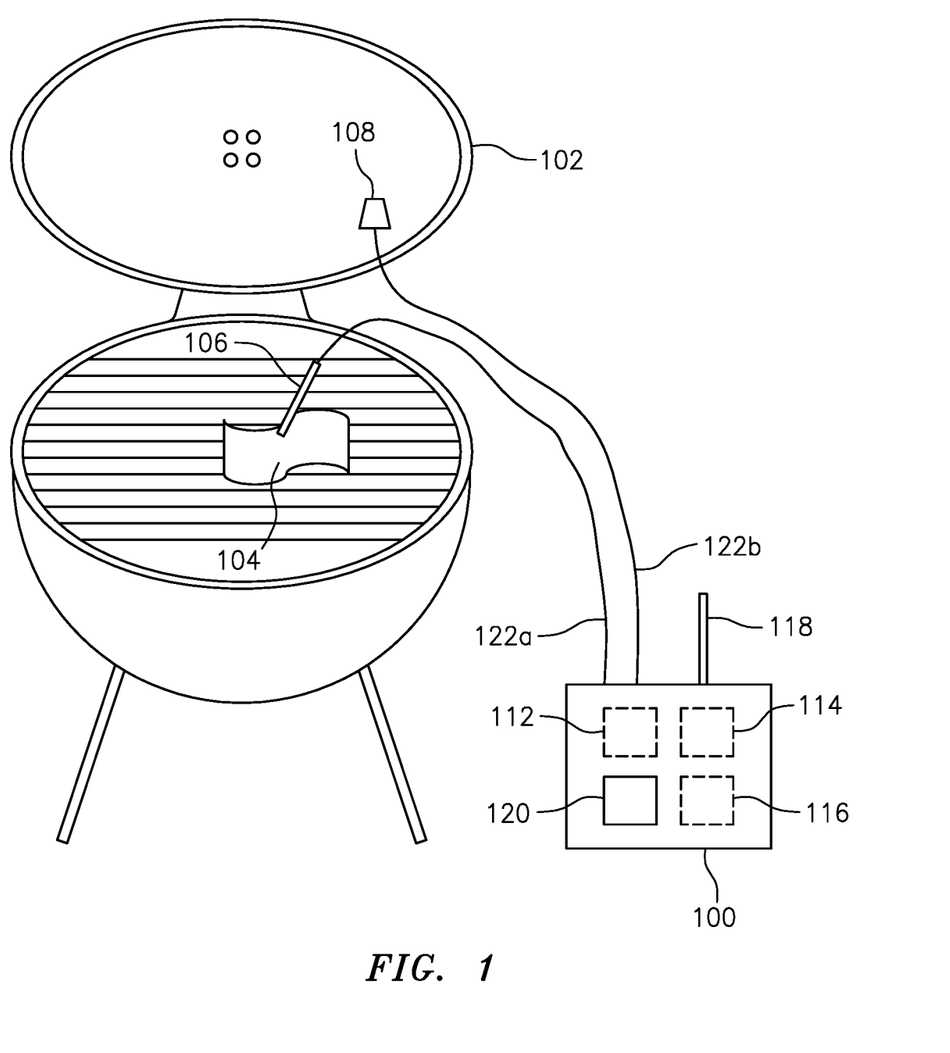
FIG. 1 is a schematic illustration of a wireless thermometer used with a barbeque cooking system.

FIG. 1 is a schematic illustration of a wireless thermometer system used with a barbeque. The wireless thermometer 100 may be used with a cooking apparatus such as a barbecue grill 102. The wireless thermometer may also be used with other cooking devices such as ovens, smokers, and the like, and such cooking devices are interchangeable with "barbecue" or "grill" as used throughout this description. An internal temperature of a portion of food 104 is measured by the food temperature sensor or probe 106 and an internal temperature of the grill 102 is measured by the cooking temperature sensor or probe 108. Other embodiments have only one temperature sensor or probe. Yet other embodiments have more than two sensors or probes. The temperature probes 106, 108 interface with and transmit signals to the wireless thermometer 100 over thermometer probe cables 122a, 122b. The temperature probes 106, 108 may interface with the wireless thermometer 100 using any means for interfacing with a digital thermometer, however, as should be known to those of ordinary skill in the art, including detachable jacks (not shown) on the cables 122a, 122b attachable to the thermometer 100 for connecting the cables, soldered connections between the cables and the thermometer, by short range wireless communications, or by other methods that may be discovered in the future. The cables and other electronic components may be shielded or insulated to prevent heat damage.

The wireless thermometer 100 has a processor 112 and a memory 114 capable of storing and executing program code and determining temperatures sensed by the temperature probes 106, 108. The wireless thermometer 100 further includes a wireless transceiver module 116 and antenna 118. The processor 112 is capable of sending and receiving communications with the wireless transceiver for monitoring and/or control of the wireless thermometer 100. The wireless thermometer 100 is configured to communicate with other wireless devices using network communications methods as should be known to those of ordinary skill in the art, such as Wi-Fi or Bluetooth, and/or such communications discussed further below. The wireless thermometer 100 may be further connectable to the internet and/or other networks, such as cellular networks. The wireless thermometer 100 may further include user interface elements 120 such as a display screen, indicator lights, buttons, touch screen, audio speakers, or other user interface elements for a user to interact with and receive alerts and information from a thermometer as should be understood by those of ordinary skill in the art. Embodiments of wireless thermometers are disclosed in U.S. Pat. No. 8,931,400 entitled "Remote Cooking Systems and Methods," which is incorporated herein by reference.

Figure 2:
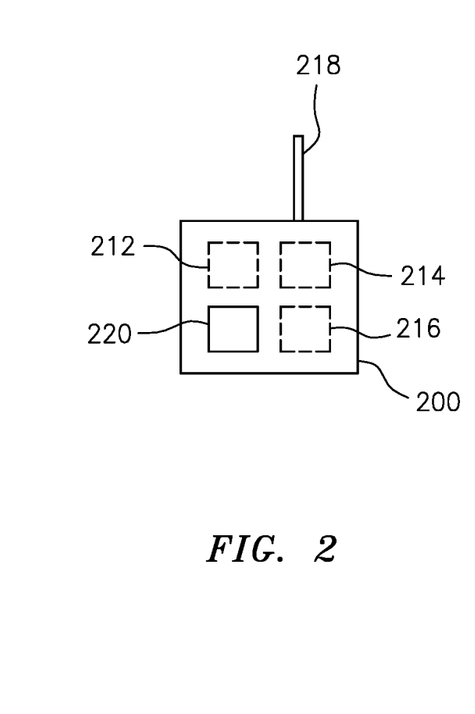
FIG. 2 is a schematic illustration of a wireless thermometer node.

FIG. 2 is a schematic illustration of an embodiment of a wireless thermometer node 200 that may be used to monitor and/or control the wireless thermometer described with respect to FIG. 1. The wireless thermometer node 200 includes a processor 212 and a memory 214 capable of storing and executing program code. The wireless thermometer node 200 includes a wireless transceiver module 216 and antenna 218 configured to connect with the wireless thermometer using, for example, short wave radio frequency communications such as Wi-Fi or Bluetooth. The wireless thermometer may be further connectable to the internet and/or other networks, such as cellular networks. The wireless thermometer node 200 may further include user interface elements 220 such as a display screen, indicator lights, buttons, touch screen, audio speaker, or other user interface elements for a user to interact with and receive alerts and information from a thermometer as should be understood by those of ordinary skill in the art. In certain embodiments, the wireless thermometer node may be any device possessing components as described here, and need not necessarily be a dedicated wireless thermometer node.

Figure 3:
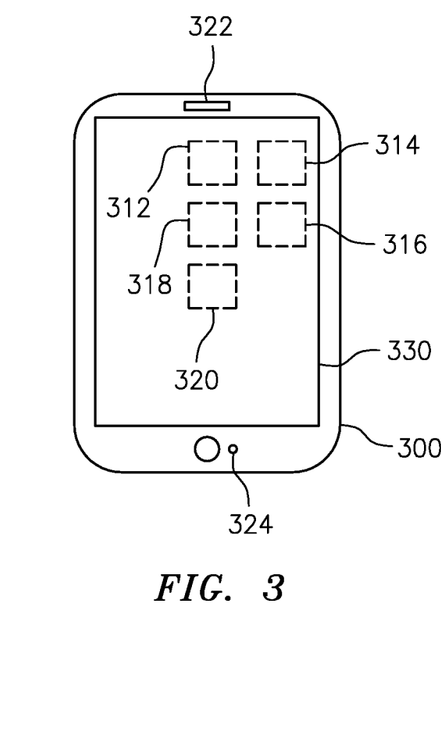
FIG. 3 is a schematic illustration of a smart device.

FIG. 3 is a schematic illustration of an embodiment of a smart device as may be used to monitor and/or control the wireless thermometer as described with respect to FIG. 1. The smart device 300 may be an Android or iOS phone or tablet or any other dedicated or general-purpose computing device capable of presenting a user interface for a user to interact with a cooking thermometer as should be understood by those of ordinary skill in the art. The smart device 300 includes a processor 312 and a memory 314 capable of storing and executing program code. The smart device 300 further includes a voice communications module 320 operatively connected with a speaker 322 and a microphone 324 for user interface. The smart device 300 includes a wireless transceiver module 316 and antenna 318. The wireless thermometer may be further connectable to the internet and/or other networks, such as cellular networks. The smart device 300 includes a display screen 330 that is operable as a user interface maintained by the processor 312, e.g., a touchscreen, using an operating system of the smart device, such as a native application running on the device or by presenting a web browser connected to the wireless thermometer or wireless thermometer node, or other user interface as should be understood by those of ordinary skill in the art. The smart device 300 may further be configured to store a temperature history of user settings and/or other information about the way the food was cooked. Data obtained over time about the user's preferences (for example, as measured by aggregate user history to determine user preferences or other methods, for example including feedback from the user on food after it has been prepared) can enable an AI to recommend or notify a user about their taste preferences according to their cooking and temperature history.

Figure 4:
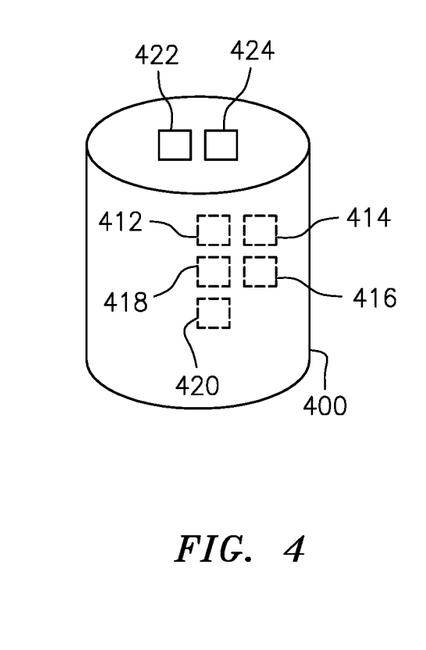
FIG. 4 is a schematic illustration of a smart audio interface.

FIG. 4 is a schematic illustration of an embodiment of a smart audio interface as may be used to monitor and/or control the wireless thermometer as described with respect to FIG. 1. The smart audio interface 400 includes a processor 412 and a memory 414 capable of storing and executing program code. The smart audio interface 400 includes a wireless transceiver module 416 and antenna 418. The smart audio interface 400 further includes a voice communications module 420 operatively connected to a speaker 422 and a microphone 424 for user interface. The smart audio interface 400 may include a voice-activated AI system running on the processor 412, or may wirelessly connect to a remote cloud server running an AI system, e.g., acting on voice commands. Examples of smart audio interfaces that may be used include the Google Assistant AI implemented on the Google Home line of smart speakers by Google Inc.; the Amazon Alexa AI implemented on the Amazon Echo line of smart speaker by Amazon.com, Inc.; the Ski AI implemented on the Apple HomePod line of smart speakers by Apple Inc., or any other voice-activated AI system implemented using a smart audio interface as should be understood by those of ordinary skill in the art.

The smart audio interface may in at least some embodiments, be controlled by a user's voice using the smart audio interface. Exemplary controls that may be performed by the user include those as described in Table 1.

TABLE 1

| Mode | Control | Feedback |
| --- | --- | --- |
| Target Temperature Setting (Barbecue/Smoker Mode) | High and Low target temperatures in order to maintain internal barbecue temperature (i.e., the temperature sensed by the cooking thermometer probe) within a desirable temperature range. | Alert by voice prompt from the smart audio interface if the internal barbecue temperature falls out of range set by the High and Low target temperatures. |
| Target Temperature Setting (Food Mode) | User programmable food Target temperature (i.e., the temperature sensed by the food thermometer probe). | Alerts by voice prompt from the smart audio interface when the cooking temperature exceeds the target Food temperature or a USDA-recommended or other temperature according to the type of food and taste level selected. |
| Target Temperature Setting (Combination Mode) | A combination of barbecue mode and food mode. | A combination of barbecue mode and food mode. |

The smart audio interface may further be configured to access historical data of user's preferences as stored on the smart device 300 (or in other storage, e.g., the cloud) as described with respect to FIG. 3 above, or other data stored on the smart audio interface or in the cloud or other device. The smart audio interface may use AI to notify and/or suggest to a user a cooking method or temperature based on the user's historical preferences. In some embodiments, a user may access remote thermometer information using the smart audio interface. For example, a user may request to check and read individual probe temperatures using the voice-activated AI system of the smart audio interface. In other embodiments, the user may provide a voice command or inquiry to the audio interface, and via a remote AI system, e.g., in the cloud, retrieve the information, which is presented to the user by the smart audio interface. See further discussion below regarding the embodiment of FIG. 6. Users may further request to mute or disable an alert sound on the wireless thermometer using the voice-activated AI system of the smart audio interface.

Figure 5:
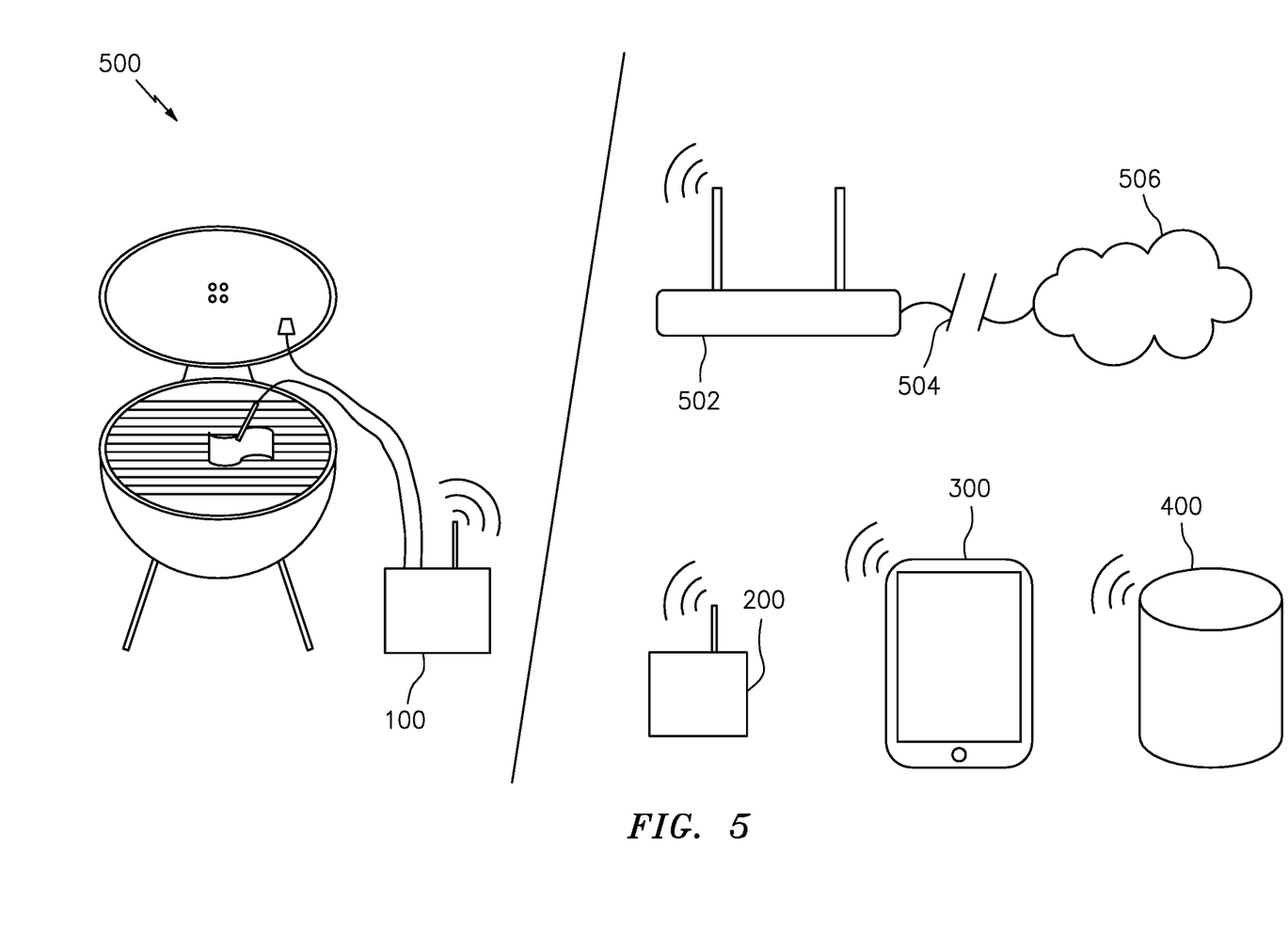
FIG. 5 is a schematic illustration of a wireless thermometer system.

FIG. 5 is a schematic illustration of an embodiment of a wireless thermometer system 500, e.g., a wireless thermometer timer system. The wireless thermometer system 500 includes the wireless thermometer 100. The wireless thermometer system 500 includes a network access point 502 providing a wireless connection to a network 504, such as the internet. In other embodiments, one or more of the devices of the wireless thermometer system 500 possess other means for wireless connection to the network 504, such as a cellular network communications interface, and need not connect through the access point 502. The access point 502 may be connected to a cloud server 506 by way of the network 504 and may provide an internal Wi-Fi network or other home or local network. The wireless thermometer system 500 includes one or more user interface devices such as the wireless thermometer node 200, the smart device 300, and/or the smart audio interface 400.

Figure 6:
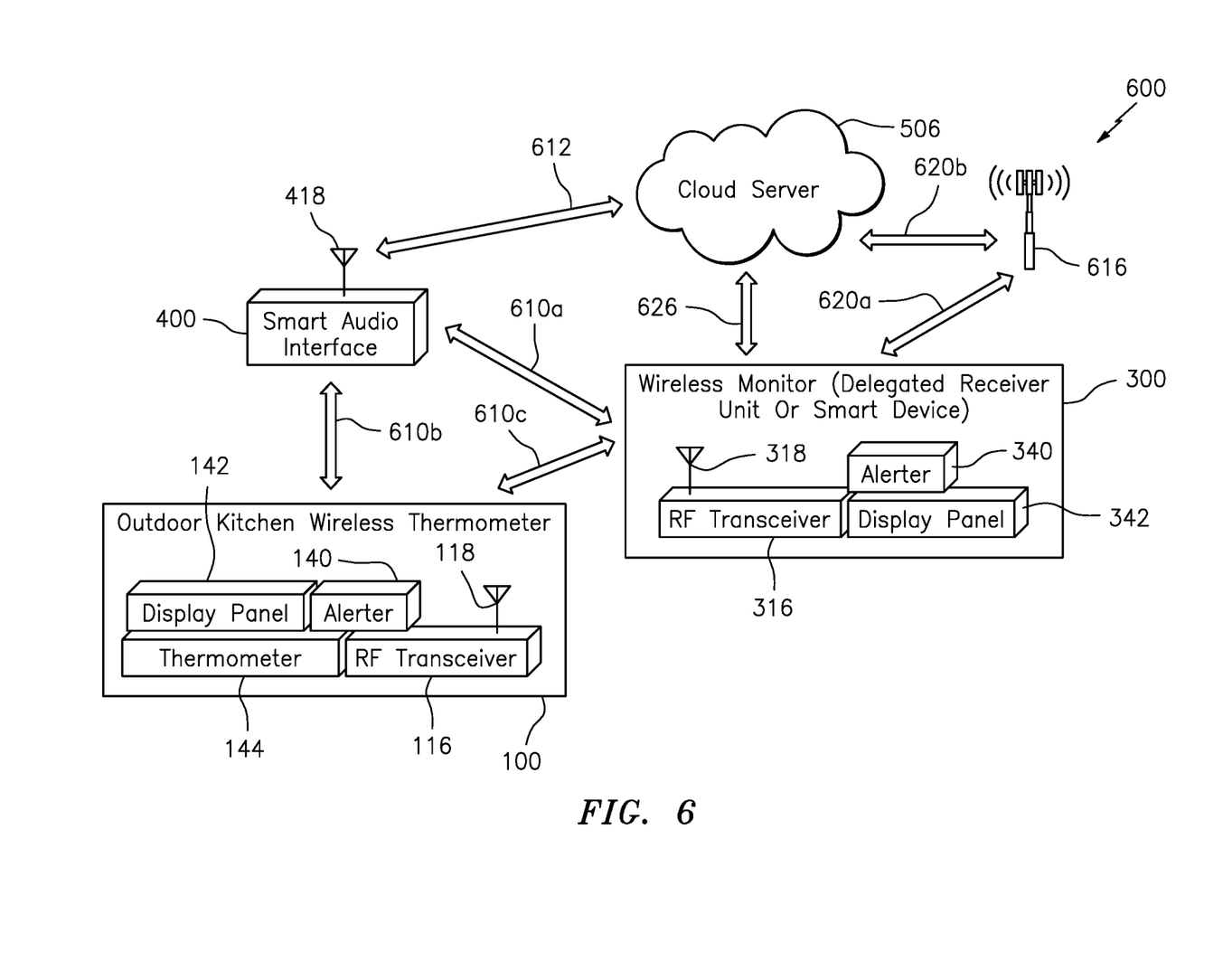
FIG. 6 is a schematic illustration of communications by a wireless thermometer system.

FIG. 6 is a schematic illustration showing communication by a wireless thermometer system 600 to remotely monitor and/or control the wireless thermometer 100. The wireless thermometer 100 has an alert module 140 and a display panel module 142 as may be implemented by the user interface elements of the wireless thermometer as previously described with respect to the wireless thermometer of FIG. 1. The wireless thermometer 100 is configured to communicate with one or more of the smart audio interface 400 or a user interface device such as the smart device 300, or with a wireless thermometer node, or other devices as described above. The smart device 300 includes an alert module 340 and a display panel module 342 as may be implemented by the speaker 322 and the display screen 330 as previously described with respect to smart device 300 of FIG. 3. The devices may communicate using a wireless communications method as should be known to those of ordinary skill in the art, such as Wi-Fi or Bluetooth. The devices 100, 300, 400 may communicate on a wireless network as provided by an access point such as that described with respect to FIG. 5. The smart audio interface 400 is in communications with a cloud server 506 or other server or method that provides AI and/or voice-recognition services for the smart audio interface. The cloud server 506 is further capable of establishing communication (such as sending alerts or other information, or receiving control information) with the smart device 300, by an access point, cellular network, or by any other method.

In some embodiments, the smart audio interface 400 can communicate with the smart device 300 via communications link or pathway 610a (which may be a direct pathway), the smart audio interface 400 can communicate with the wireless thermometer 100 via communications link or pathway 610b (which may be a direct pathway), and the smart device 300 can communicate with the wireless thermometer 100 via link or pathway 610c (which may be a direct pathway). In certain embodiments, the links 610a, 610b, 610c are wireless, and may be provided via a Wi-Fi or Bluetooth connection, or any other suitable communication wireless connection as should be understood by those of ordinary skill in the art. The smart audio interface 400 can communicate with a cloud server 506 or other server or method that provides AI and/or voice-recognition services for the smart audio interface via communications link or pathway 612. The pathway 612 may be defined by any suitable communications pathway, including but not limited to wireless (e.g., Wi-Fi), wired, or cellular networks, or combinations thereof. In some embodiments, the link 612 is part of the same network that includes links 610a, 610b, 610c. In other embodiments, the link 612 is separate network or connection. The cloud server 506 is further capable of establishing communication (such as sending alerts or other information, or receiving control information) with the smart device 300 (and vice versa) via communications link or pathway 626, which may be defined by any suitable communications pathway, including but not limited to wireless (e.g., Wi-Fi), wired, or cellular networks, or combinations thereof, or by an access point or by any other method. Alternatively, the cloud server 506 and the smart device 300 can communicate via a cellular tower 616, which provides cellular network communications between the tower 616 and the smart device 300 via link or pathway 620a, and between the tower 616 and the cloud server 506 via link or pathway 620b.

Accordingly, the components can communicate with each other via one or more intermediary devices using one or more pathways therebetween and/or combinations thereof, such as smart phones, tablets, or other computing devices such as smart device 300, cloud services or other network-based services, smart home device hubs such as smart audio interface 400, or any other device configured to interact with a smart audio interface as should be understood by those of ordinary skill in the art. Thus, any alerts, notifications, temperature data, etc. communicated amongst these components may take any path via the links. By way of example, communications from the artificial intelligence can be delivered to the smart audio interface 400, and need not be delivered by the link 612 between the cloud server and the smart audio interface. It should also be understood that intermediary devices such as routers and other networking devices may be utilized along the paths, even though not explicitly shown in the Figures.

The smart audio interface and/or the wireless thermometer may be configured to send alerts or notifications to the user, for example, using the smart device 300. Alerts may be sent when the food is ready to eat according to a set taste level or to the user's preferences or other settings, as described above with respect to FIG. 4. Alerts may be further provided by voice prompt from the smart audio interface or the smart device 300 or another device. Alerts may be sent when a timer reaches a target cooking time set by a user or according to a set taste level or other setting. In certain embodiments, an alert or notification may be sent to a user before the target cooking temperature or time is reached, in order to, for example, provide the user sufficient time to stop cooking the food before it is overcooked. If a user is out of range of the wireless thermometer or the local network, the cloud server 506 may present alerts or voice-interaction using the smart device 300 or another device.

In some embodiments, a determination of whether a temperature parameter (e.g., a food temperature parameter) set or selected by a user (e.g., via the smart audio interface 400, the smart device 300, or other interface) has been met or exceeded as compared to the temperature measured by the wireless thermometer 100 is made by an application on a smart device, a wireless thermometer node, or by a remote cloud server, e.g., an AI resident thereon. In certain embodiments, the determination that the temperature parameter has been met or exceeded causes the smart audio interface 400 or other device to enter an alert status. In some embodiments, the alert status causes a user to be alerted that the temperature parameter has been met or exceeded. In certain embodiments, the alert status is activated at a warning temperature based on the temperature parameter. The warning temperature may be a temperature that is set to allow the user enough time to stop cooking the food before the food becomes fully cooked. In some embodiments, the temperature parameter may be a limit or threshold temperature that when exceeded causes the alert status to be activated.

The smart audio interface may be further configured to respond to voice commands inquiring about one or more measurements by or information stored by the wireless thermometer. The smart audio interface may be configured to respond to voice commands inquiring about individual temperature probes, timer settings, temperature settings, and/or other settings, as should be understood by those of ordinary skill in the art. The user may be able to mute or disable alert sounds using voice commands via the smart audio interface.

Figure 7:
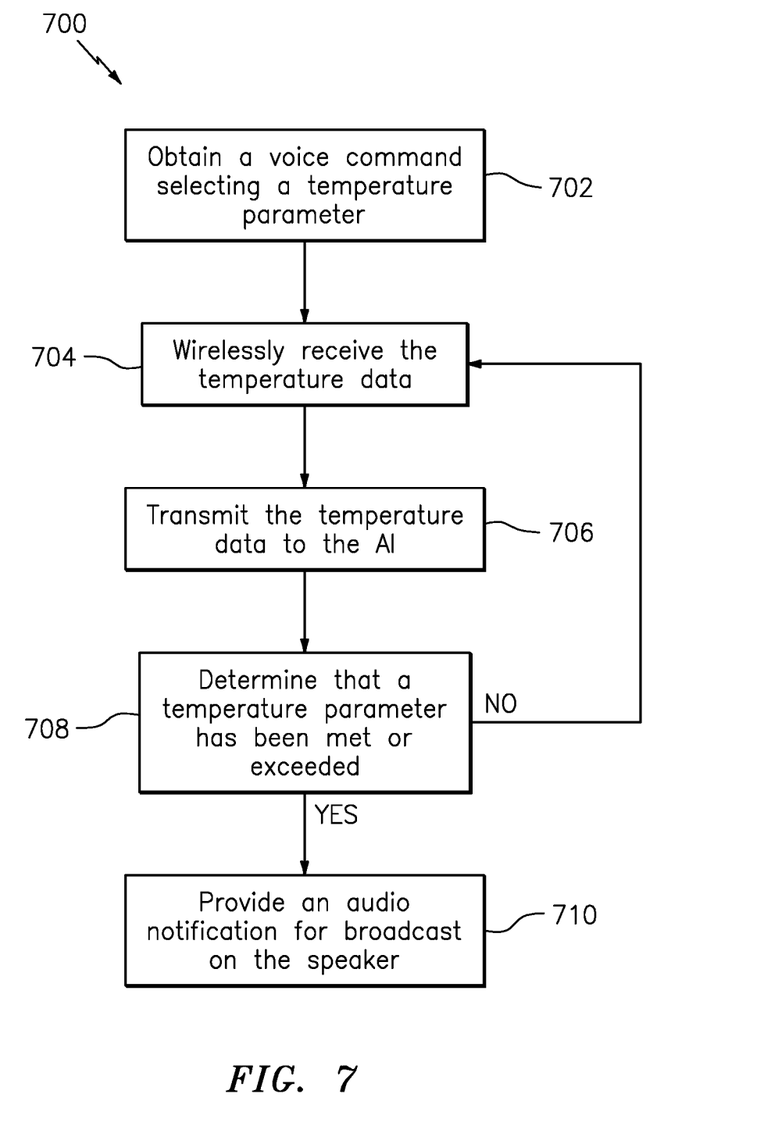
FIG. 7 is a block diagram showing a process for generating an alert for a user.

FIG. 7 is a block diagram showing an exemplary method of sending an alert to a user indicating that a temperature parameter has been met or exceeded. The method 700 results in a user being alerted that a temperature parameter has been met or exceeded, and, as several examples, thereby indicating that a food portion is finished cooking or an internal barbecue threshold temperature has been exceeded (either higher or lower than the desired range). The smart audio interface obtains a voice command selecting a temperature parameter (step 702). In some embodiments, the temperature parameter represents a temperature limit. The smart audio interface is communicatively coupled with a cloud server having an artificial intelligence configured to process, and where appropriate, respond to voice commands obtained by the smart audio interface. Users of the system may interface with the artificial intelligence using the speaker and microphone of the smart audio interface, as previously discussed. In some embodiments, a speaker and microphone for interfacing with the voice-activated artificial intelligence are provided on a smart device, as previously discussed. In certain embodiments, the voice command is obtained from the user by a microphone of the smart audio interface or smart device, and alerts and notifications are provided by the artificial intelligence to the smart audio interface or smart device.

The wireless thermometer senses temperature data from temperature probe(s), e.g., probes inserted in the food portion (e.g., food portion 104) being cooked and in the cooking chamber. The wireless thermometer transmits sensed temperature data to a smart audio interface. The smart audio interface wirelessly receives the temperature data from the wireless thermometer (step 704). In some embodiments, the smart audio interface may transmit or receive the temperature data via the cloud server or a smart device or some other device, e.g., over one or more communication pathways as discussed above with respect to FIG. 6.

The wireless thermometer system, in some embodiments, receives, from the artificial intelligence, a temperature parameter corresponding to a desired food preparation. This temperature parameter may be a pre-set temperature according to USDA guidelines, a preference inputted by the user, or some other temperature parameter. The artificial intelligence may be configured to suggest a temperature parameter based on historical information, such as temperature data collected during previous cooking sessions, on the user's preferences, or based on any other information that may provide temperature guidance to the user (e.g., cooking guidelines, cookbook recipes, etc.). In some embodiments, a user of the wireless thermometer system can confirm that a suggested temperature parameter is the desired temperature parameter, for example, by responding affirmatively to the suggestion broadcast from the speaker, e.g., from the artificial intelligence.

The smart audio interface transmits the temperature data received from the wireless thermometer to the artificial intelligence (step 706). The wireless thermometer system (i.e., the artificial intelligence) determines whether the temperature parameter has been met or exceeded (step 708). However, in other embodiments, the determination that a temperature parameter has been met or exceeded may be performed at the wireless thermometer itself. In other embodiments, temperature parameters and temperature (e.g., comparison thereof) are provided to and monitoring is performed on one or more of the smart audio interface, a smart device, a wireless thermometer node, or some other device. The above-mentioned devices in the system (e.g., a smart device, a wireless thermometer or wireless thermometer node, a smart audio interface, a cloud server, etc.) may include an application or process that when executed monitors the temperature data provided by the wireless thermometer and determines whether a temperature parameter has been met or exceeded.

If it is determined that that the temperature parameter has not been met or exceeded, the sensed temperatures are continued to be monitored.

However, when the temperature parameter has been exceeded, the smart audio interface provides an audio notification for broadcast on the speaker (step 710), e.g., an alert sound or message (spoken words). For example, in the case of cooking food, the smart audio interface 400 may provide such an audio notification to notify the user that their food has finished cooking. In some embodiments, the alert sound or message is broadcast at the smart audio interface 400. In other embodiments, the smart audio interface 400 causes a notification to be sent to a smart device 300 of the user in order to notify the user that their food has finished cooking. In certain such embodiments, the smart device 300 may produce an audio alert or message. In yet other embodiments, the artificial intelligence sends a notification to the user over a cellular data network 620*a*, 620*b* to the smart device 300, for example, when the user is out of range of the smart audio interface 400, as discussed above.

Figure 8:
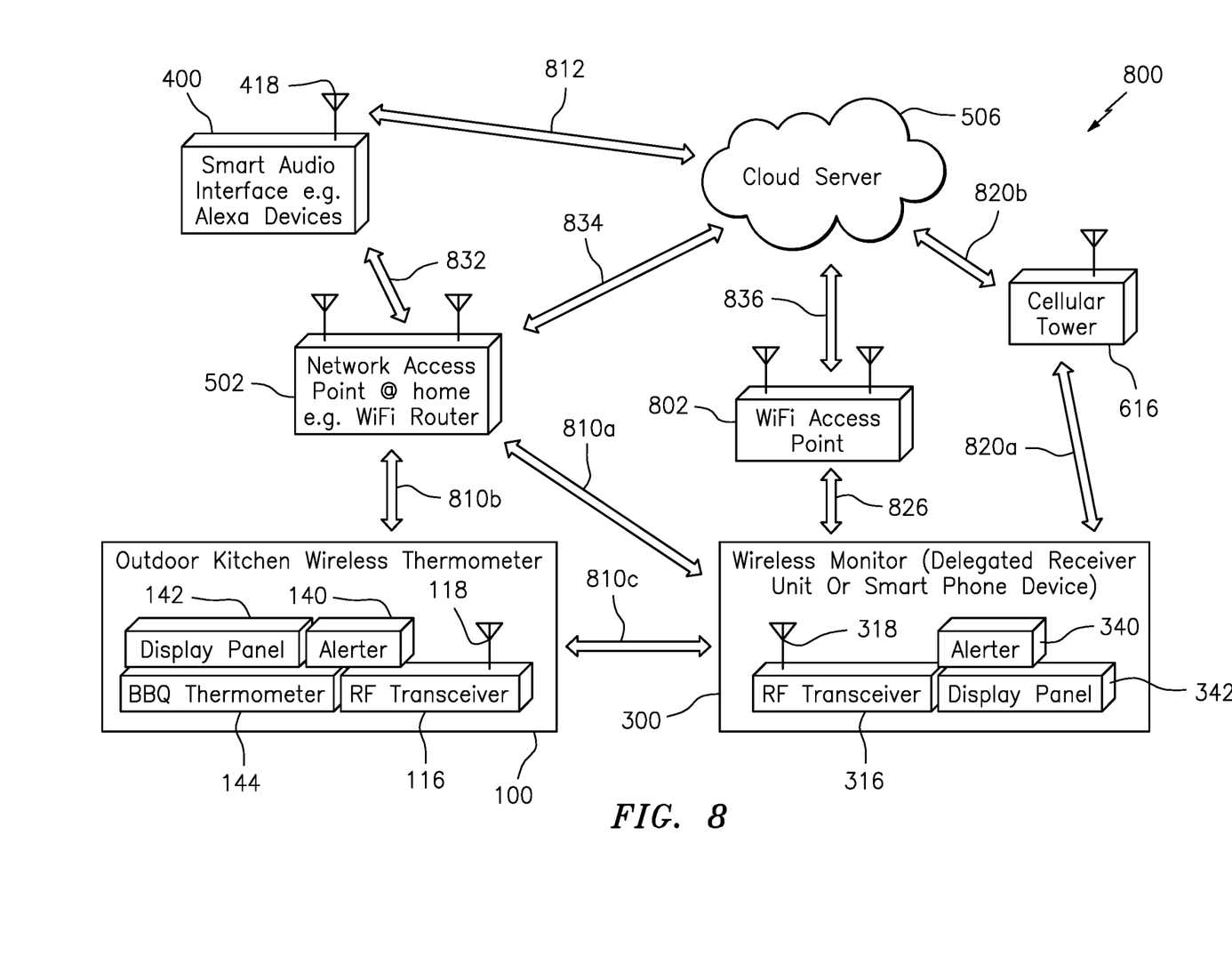
FIG. 8 is a schematic illustration of communications by a wireless thermometer system.

FIG. 8 is a schematic illustration showing communication by a wireless thermometer system 800 to remotely monitor and/or control the wireless thermometer 100. System 800 is similar in certain respects to system 600 and includes certain features also used in system 600. Accordingly, features designated with reference numerals that are the same as features in system 600 are the same or similar components. Further, like reference numerals preceded by the numeral "8" instead of "6" are used to indicate like or similar elements.

The wireless thermometer 100 has an alert module 140 and a display panel module 142 as may be implemented by the user interface elements of the wireless thermometer as previously described with respect to the wireless thermometer of FIG. 1. The wireless thermometer 100 is configured to communicate with one or more of the smart audio interface 400 or a user interface device such as the smart device 300, or with a wireless thermometer node, or other devices as described above. The smart device 300 includes an alert module 340 and a display panel module 342 as may be implemented by the speaker 322 and the display screen 330 as previously described with respect to smart device 300 of FIG. 3. The devices may communicate using a wireless communications method as should be known to those of ordinary skill in the art, such as Wi-Fi or Bluetooth. The devices 100, 300, 400 may communicate on a wireless network as provided by an access point such as that described with respect to FIG. 5. The smart audio interface 400 is in communications with a cloud server 506 or other server or method that provides AI and/or voice-recognition services for the smart audio interface. The cloud server 506 is further capable of establishing communication (such as sending alerts or other information, or receiving control information) with the smart device 300, by an access point, cellular network, or by any other method.

In the illustrated embodiments, the smart audio interface 400 can communicate with the smart device 300 via an access point 502 (e.g., a WiFi router) via communications links or pathways 832 and 810a, the smart audio interface 400 can communicate with the wireless thermometer 100 via the access point 502 via communications links or pathways 832 and 810b, and the smart device 300 can communicate with the wireless thermometer 100 via link or pathway 810c (which may be a direct pathway). In certain embodiments, one or more of the links 810a, 810b, 810c, 832 are wireless, and may be provided via a Wi-Fi or Bluetooth connection, or any other suitable communication wireless connection as should be understood by those of ordinary skill in the art. The smart audio interface 400 can communicate with a cloud server 506 or other server or method that provides AI and/or voice-recognition services for the smart audio interface via communications link or pathway 812. The pathway 812 may be defined by any suitable communications pathway, including but not limited to wireless (e.g., Wi-Fi), wired, or cellular networks, or combinations thereof. In some embodiments, the link 812 is part of the same network that includes one or more of links 810a, 810b, 810c, 832. In other embodiments, the link 812 is separate network or connection. The cloud server 506 is further capable of establishing communication (such as sending alerts or other information, or receiving control information) with the smart device 300 (and vice versa) via an access point 802 via communications links or pathways 826, 836, which may be defined by any suitable communications pathway, including but not limited to wireless (e.g., Wi-Fi), wired, or cellular networks, or combinations thereof, or by an access point or by any other method. Alternatively, the cloud server 506 and the smart device 300 can communicate via a cellular tower 616, which provides cellular network communications between the tower 616 and the smart device 300 via link or pathway 820a, and between the tower 616 and the cloud server 506 via link or pathway 820b. Further, the cloud server 506, audio interface 400, wireless thermometer 100, and the smart device 300 can communicate with each other via access point 502 via links 810a, 810b, 832, 834.

As should be understood, then, the components can communicate with each other via any of or combinations of the available pathways and intermediary devices. Thus, any alerts, notifications, temperature data, etc. communicated amongst these components may take any path via the links. It should also be understood that further intermediary devices such as routers and other networking devices may be utilized along the paths, even though not explicitly shown in FIG. 8. Accordingly, for example, if a user is out of range of the wireless thermometer or the local network, the cloud server 506 may present alerts or voice-interaction using the smart device 300 or another device.

As should be apparent to those of ordinary skill in the art, since more than one device in the system can possess the ability to send and receive notifications or control instructions, including alerts, settings, and temperature monitoring, and the ability to determine whether the temperature parameter has been exceeded, this description is intended to disclose all possible combinations thereof, and this description should not be interpreted to apply only to the specific exemplary devices and communications between them as described herein or the exemplary methods described herein.

As may be recognized by those of ordinary skill in the pertinent art based on the teachings herein, numerous changes and modifications may be made to the above-described and other embodiments of the present disclosure without departing from the spirit of the invention as defined in the claims. For example, though the embodiments described above relate to the cooking of food, the invention may be utilized to monitor the temperatures of other items and materials. Accordingly, this detailed description of embodiments is to be taken in an illustrative, as opposed to a limiting sense.

What is claimed is:

1. A system comprising:
    a wireless thermometer communicatively connected with at least one temperature sensor adapted to sense temperature, wherein the wireless thermometer is adapted to wirelessly transmit temperature data derived from temperature sensed by the temperature sensor; and
    a smart audio interface including or communicatively connectable to a microphone and a speaker and communicatively coupleable with a cloud server, wherein the cloud server includes an artificial intelligence adapted to compare the temperature data and the temperature parameter and also adapted to generate a response to a voice command received by the microphone, and the smart audio interface is adapted to generate an audio notification for broadcast on the speaker based on said response received from the artificial intelligence;
    wherein the smart audio interface is further adapted to:
        obtain, via the microphone, a voice command selecting a temperature parameter;
        wirelessly receive the temperature data from the wireless thermometer;
        transmit the temperature data to the artificial intelligence;
        provide an audio notification for broadcast on the speaker indicating that the temperature parameter has been met or exceeded based upon a comparison of the temperature data and the temperature parameter by the artificial intelligence; and
        transmit the temperature parameter to the wireless thermometer;
    wherein the wireless thermometer is adapted to receive and store the temperature parameter from the smart audio interface;
    wherein the wireless thermometer is adapted to compare said sensed temperature data to said temperature parameter;
    wherein the wireless thermometer is adapted to generate an audio alert when the temperature parameter has been met or exceeded;

wherein the smart audio interface is adapted to obtain, via the microphone, a voice command requesting that the audio alert generated by the wireless thermometer be disabled or muted;

wherein the smart audio interface is adapted to transmit an instruction to the wireless thermometer to disable or mute the audio alert generated by the wireless thermometer; and wherein the wireless thermometer is adapted to receive and execute the instruction from the smart audio interface and disable or mute the audio alert generated by the wireless thermometer.

2. The system according to claim 1, further including a smart device comprising the microphone and the speaker and communicatively coupleable with the cloud server.

3. The system according to claim 2, wherein the artificial intelligence is adapted to generate the audio notification for broadcast on the speaker of the smart device.

4. The system of claim 3, wherein the smart device is adapted to receive the generated audio notification from the artificial intelligence over a cellular data communications network or other network.

5. The system of claim 2, wherein the smart audio interface is adapted to generate the audio notification for broadcast on the speaker of the smart device.

6. The system according to claim 1, including a further temperature sensor.

7. The system according to claim 6, wherein the at least one temperature sensor and the further temperature sensor include a food temperature sensor adapted to sense a food temperature and a cooking device temperature sensor adapted to sense a temperature of a cooking device.

8. The system of claim 7, wherein one or more of (i) the temperature parameter defines a food temperature limit, and the audio notification is configured to indicate that a food temperature sensed by the food temperature sensor meets or exceeds the food temperature limit, or (ii) the temperature parameter includes a cooking device temperature limit, and the audio notification is configured to indicate that a cooking device temperature sensed by the cooking device temperature sensor is outside the cooking device temperature limit.

9. The system of claim 1, wherein the temperature parameter further includes a cooking time of a food item, and the smart audio interface is further adapted to provide an audio notification for broadcast on the speaker indicating that a time for which the food item has been cooked meets or exceeds the cooking time.

10. The system of claim 1, wherein the smart audio interface is further adapted to provide an audio notification for broadcast on the speaker indicating a temperature parameter for a food item generated by the artificial intelligence based on a food taste setting, a food preparation guideline, or a user preference setting for said food item.

11. The system of claim 1, wherein the smart audio interface is adapted to store one or more previously selected temperature parameters for cooking a food obtained via the microphone and to provide an audio notification for broadcast on the speaker indicating a temperature parameter for cooking said food generated by the artificial intelligence based on said one or more previously selected temperature parameters.

12. The system of claim 11, wherein the smart audio interface is adapted to transmit said one or more previously selected temperature parameters to the cloud server.

13. The system of claim 1, wherein the temperature parameter includes a warning temperature that is (a) lower than the temperature limit or (b) higher than the temperature limit, and the smart audio interface is adapted provide an audio notification for broadcast on the speaker indicating that the warning temperature has been met or exceeded based upon a comparison of the temperature data and the warning temperature by the artificial intelligence.

14. The system of claim 1, wherein the smart audio interface is further adapted to obtain, via the microphone, a voice command requesting an audio notification indicating said temperature data and to provide an audio notification for broadcast on the speaker indicating said temperature data generated by the artificial intelligence.

15. The system of claim 1, further including a smart device separate from the smart audio interface, wherein the wireless thermometer and the smart audio interface are configured to directly wirelessly communicate via a first communications pathway, the wireless thermometer and the smart device are configured to directly wirelessly communicate via a second communications pathway, the smart audio interface and the smart device are configured to directly wirelessly communicate via a third communications pathway, the smart audio interface and the cloud server are configured to communicate via a fourth communications pathway, and the cloud server and the smart device are configured to communicate via a fifth communications pathway, and wherein the wireless thermometer and the smart audio interface are configured to communicate via the first communications pathway when said first communications pathway is available for communication therebetween, and configured to communicate via a combination of one or more of the second, third, fourth and fifth communications pathways when said first communications pathway is not available for communication therebetween, and the smart audio interface and the smart device are configured to communicate via the third communications pathway when said third communications pathway is available for communication therebetween, and configured to communicate via a combination of one or more of the first, second, fourth and fifth communications pathway when said third communications pathway is not available for communication therebetween.

16. The system of claim 1, wherein one or more of
(i) the temperature parameter defines a temperature limit and the audio notification is configured to indicate that the temperature data meets or exceeds the temperature limit; or
(ii) the temperature parameter defines a temperature range and the audio notification is configured to indicate that the temperature data is outside the temperature range.

17. A system as defined in claim 1, wherein the audio notification defines spoken words for broadcast on the speaker.

18. A method comprising:
obtaining, via a microphone of a smart audio interface, a voice command selecting a temperature parameter;
sensing at least one temperature with at least one temperature sensor of a wireless thermometer;
wirelessly transmitting the at least one sensed temperature to the smart audio interface;
wirelessly receiving the at least one sensed temperature with the smart audio interface;
transmitting, using the smart audio interface, the at least one sensed temperature and the temperature parameter to an artificial intelligence that is adapted to compare the temperature data and the temperature parameter;
providing an audio notification for broadcast on a speaker of the smart audio interface indicating that the temperature parameter has been met or exceeded based upon a comparison of the at least one sensed temperature and the temperature parameter by the artificial intelligence;

transmitting the temperature parameter to the wireless thermometer;

receiving and storing the temperature parameter from the smart audio device with the wireless thermometer;

comparing, using the wireless thermometer, the at least one sensed temperature data to the temperature parameter;

generating, using the wireless thermometer, an audio alert when the temperature parameter has been met or exceeded;

obtaining, via the microphone, a voice command requesting that the audio alert generated by the wireless thermometer be disabled or muted;

transmitting with the smart audio interface an instruction to the wireless thermometer to disable or mute the audio alert generated by the wireless thermometer;

receiving the instruction with the wireless thermometer; and executing with the wireless thermometer the instruction and disabling or muting the audio alert generated by the wireless thermometer.

19. The method according to claim 18, wherein one or more of
   (i) the temperature parameter defines a temperature limit and the providing step includes providing an audio notification indicating that the at least one sensed temperature has met or exceeded the temperature limit; or
   (ii) the temperature parameter defines a temperature range and the providing step includes providing an audio notification indicating that the at least one sensed temperature is outside of the temperature range.

20. The method of claim 18, wherein the temperature parameter defines a temperature limit and a warning temperature that is (a) lower than the temperature limit or (b) higher than the temperature limit, and the method further includes providing an audio notification for broadcast on the speaker indicating that the warning temperature has been met or exceeded based upon a comparison of the temperature data and the warning temperature by the artificial intelligence.

21. The method of claim 18, wherein the audio notification defines spoken words and the method further includes broadcasting said spoken words on the speaker.

22. A system comprising:
   a wireless thermometer communicatively connected with at least one temperature sensor adapted to sense temperature, wherein the wireless thermometer is adapted to wirelessly transmit temperature data derived from temperature sensed by the temperature sensor;
   a smart audio interface including or communicatively connectable to a microphone and a speaker and communicatively coupleable with a cloud server, wherein the cloud server includes an artificial intelligence adapted to generate a response to a voice command received by the microphone, and the smart audio interface is adapted to generate an audio notification for broadcast on the speaker based on said response received from the artificial intelligence;
   wherein the smart audio interface is further adapted to:
      obtain, via the microphone, a voice command selecting a temperature parameter;
      wirelessly receive the temperature data from the wireless thermometer;
      transmit the temperature data to the artificial intelligence;
      provide an audio notification for broadcast on the speaker indicating that the temperature parameter has been met or exceeded based upon a comparison of the temperature data and the temperature parameter by the artificial intelligence; and
   a smart device separate from the smart audio interface, wherein the wireless thermometer and the smart audio interface are configured to directly wirelessly communicate via a first communications pathway, the wireless thermometer and the smart device are configured to directly wirelessly communicate via a second communications pathway, the smart audio interface and the smart device are configured to directly wirelessly communicate via a third communications pathway, the smart audio interface and the cloud server are configured to communicate via a fourth communications pathway, and the cloud server and the smart device are configured to communicate via a fifth communications pathway, and wherein the wireless thermometer and the smart audio interface are configured to communicate via the first communications pathway when said first communications pathway is available for communication therebetween, and configured to communicate via a combination of one or more of the second, third, fourth and fifth communications pathways when said first communications pathway is not available for communication therebetween, and the smart audio interface and the smart device are configured to communicate via the third communications pathway when said third communications pathway is available for communication therebetween, and configured to communicate via a combination of one or more of the first, second, fourth and fifth communications pathway when said third communications pathway is not available for communication therebetween.

23. The system according to claim 22, wherein the smart device includes a microphone and a speaker.

24. The system according to claim 23, wherein the artificial intelligence is adapted to generate the audio notification for broadcast on the speaker of the smart device.

25. The system of claim 24, wherein the smart device is adapted to receive the generated audio notification from the artificial intelligence over a cellular data communications network or other network.

26. The system of claim 23, wherein the smart audio interface is adapted to generate the audio notification for broadcast on the speaker of the smart device.

27. The system according to claim 22, including a further temperature sensor.

28. The system according to claim 27, wherein the at least one temperature sensor and the further temperature sensor include a food temperature sensor adapted to sense a food temperature and a cooking device temperature sensor adapted to sense a temperature of a cooking device.

29. The system of claim 28, wherein one or more of (i) the temperature parameter defines a food temperature limit, and the audio notification is configured to indicate that a food temperature sensed by the food temperature sensor meets or exceeds the food temperature limit, or (ii) the temperature parameter includes a cooking device temperature limit, and the audio notification is configured to indicate that a cooking device temperature sensed by the cooking device temperature sensor is outside the cooking device temperature limit.

30. The system of claim 22, wherein the temperature parameter further includes a cooking time of a food item, and the smart audio interface is further adapted to provide an audio notification for broadcast on the speaker indicating that a time for which the food item has been cooked meets or exceeds the cooking time.

31. The system of claim 22, wherein the smart audio interface is further adapted to provide an audio notification for broadcast on the speaker indicating a temperature parameter for a food item generated by the artificial intelligence based on a food taste setting, a food preparation guideline, or a user preference setting for said food item.

32. The system of claim 22, wherein the smart audio interface is adapted to store one or more previously selected temperature parameters for cooking a food obtained via the microphone and to provide an audio notification for broadcast on the speaker indicating a temperature parameter for cooking said food generated by the artificial intelligence based on said one or more previously selected temperature parameters.

33. The system of claim 32, wherein the smart audio interface is adapted to transmit said one or more previously selected temperature parameters to the cloud server.

34. The system of claim 22, wherein the temperature parameter includes a warning temperature that is (a) lower than the temperature limit or (b) higher than the temperature limit, and the smart audio interface is adapted provide an audio notification for broadcast on the speaker indicating that the warning temperature has been met or exceeded based upon a comparison of the temperature data and the warning temperature by the artificial intelligence.

35. The system of claim 22, wherein the smart audio interface is further adapted to obtain, via the microphone, a voice command requesting an audio notification indicating said temperature data and to provide an audio notification for broadcast on the speaker indicating said temperature data generated by the artificial intelligence.

36. The system of claim 22, wherein one or more of
(i) the temperature parameter defines a temperature limit and the audio notification is configured to indicate that the temperature data meets or exceeds the temperature limit; or
(ii) the temperature parameter defines a temperature range and the audio notification is configured to indicate that the temperature data is outside the temperature range.

37. A system as defined in claim 22, wherein the audio notification defines spoken words for broadcast on the speaker.

38. A method comprising:
obtaining, via a microphone of a smart audio interface, a voice command selecting a temperature parameter;
sensing at least one temperature with at least one temperature sensor of a wireless thermometer;
wirelessly transmitting the at least one sensed temperature to the smart audio interface;
wirelessly receiving the at least one sensed temperature with the smart audio interface;
transmitting the at least one sensed temperature to an artificial intelligence with the smart audio interface; and
providing an audio notification for broadcast on a speaker of the smart audio interface indicating that the temperature parameter has been met or exceeded based upon a comparison of the at least one sensed temperature and the temperature parameter by the artificial intelligence;
wherein the wireless thermometer and the smart audio interface are configured to directly wirelessly communicate via a first communications pathway, the wireless thermometer and a smart device separate from the smart audio interface are configured to directly wirelessly communicate via a second communications pathway, the smart audio interface and the smart device are configured to directly wirelessly communicate via a third communications pathway, the smart audio interface and the cloud server are configured to communicate via a fourth communications pathway, and the cloud server and the smart device are configured to communicate via a fifth communications pathway, and wherein the wireless thermometer and the smart audio interface are configured to communicate via the first communications pathway when said first communications pathway is available for communication therebetween, and configured to communicate via a combination of one or more of the second, third, fourth and fifth communications pathways when said first communications pathway is not available for communication therebetween, and the smart audio interface and the smart device are configured to communicate via the third communications pathway when said third communications pathway is available for communication therebetween, and configured to communicate via a combination of one or more of the first, second, fourth and fifth communications pathway when said third communications pathway is not available for communication therebetween.

39. The method according to claim 38, wherein one or more of
(i) the temperature parameter defines a temperature limit and the providing step includes providing an audio notification indicating that the at least one sensed temperature has met or exceeded the temperature limit; or
(ii) the temperature parameter defines a temperature range and the providing step includes providing an audio notification indicating that the at least one sensed temperature is outside of the temperature range.

40. The method of claim 38, wherein the temperature parameter defines a temperature limit and a warning temperature that is (a) lower than the temperature limit or (b) higher than the temperature limit, and the method further includes providing an audio notification for broadcast on the speaker indicating that the warning temperature has been met or exceeded based upon a comparison of the temperature data and the warning temperature by the artificial intelligence.

41. The method of claim 38, wherein the audio notification defines spoken words and the method further includes broadcasting said spoken words on the speaker.

* * * * *